Figure 1:
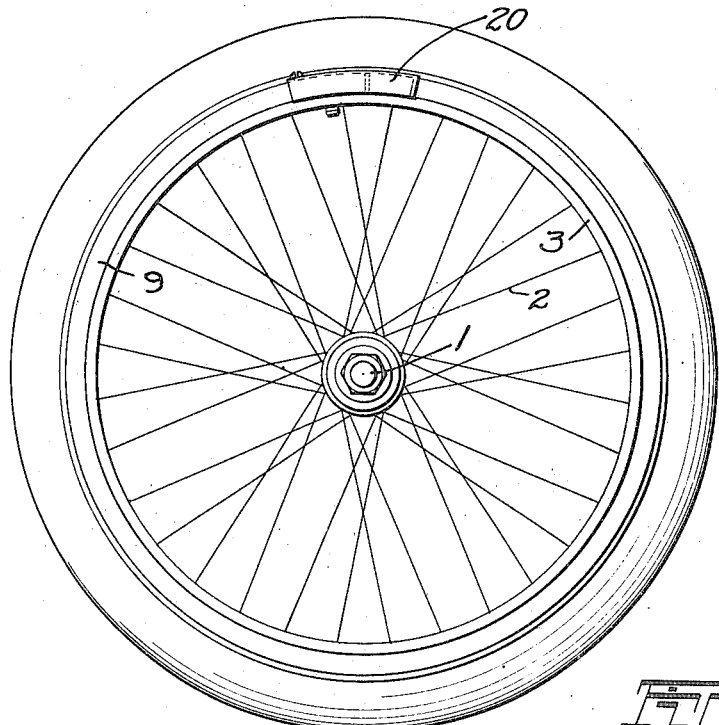

H. KAPLAN.
LOCKING RING FOR TIRES.
APPLICATION FILED MAR. 8, 1915.

1,180,502.

Patented Apr. 25, 1916.
2 SHEETS—SHEET 1.

WITNESSES:

INVENTOR.
H. KAPLAN.
BY Carlos P. Griffin
ATTORNEY.

H. KAPLAN.
LOCKING RING FOR TIRES.
APPLICATION FILED MAR. 8, 1915.
1,180,502.
Patented Apr. 25, 1916.
2 SHEETS—SHEET 2.
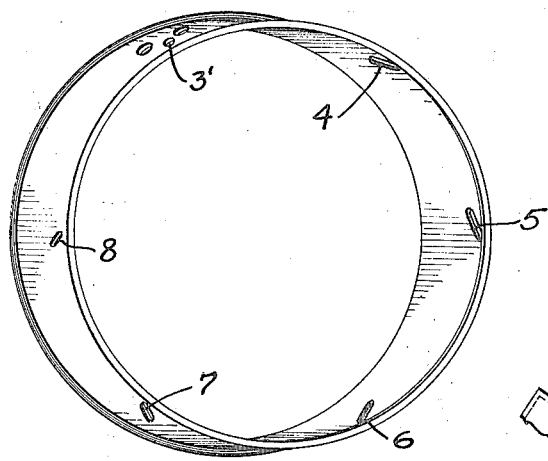
Fig. 3.
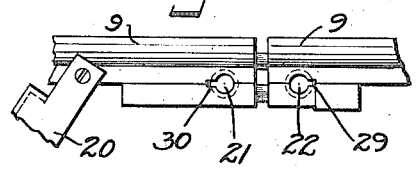
Fig. 5.
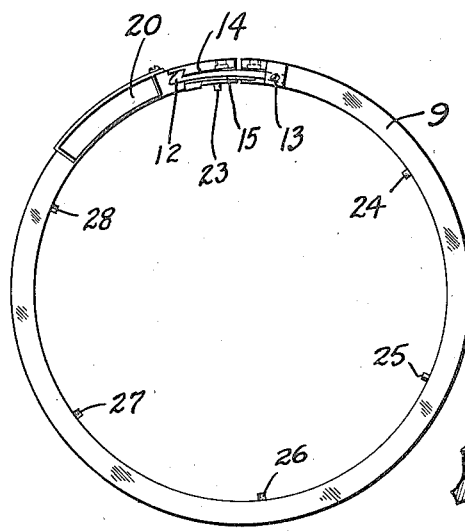
Fig. 4.
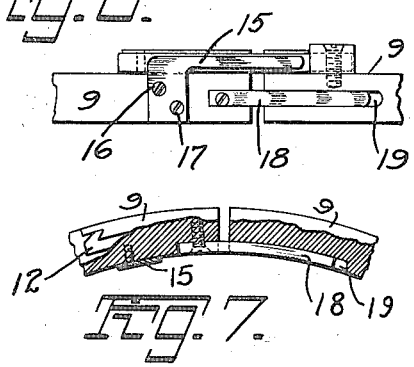
Fig. 6.
Fig. 7.
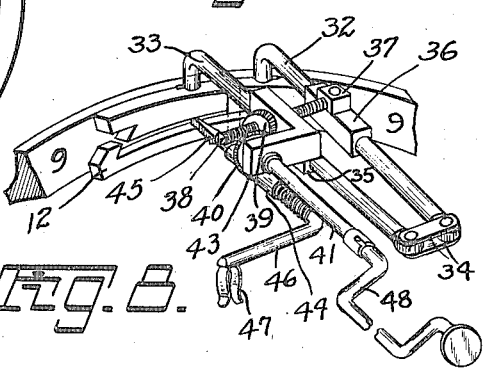
Fig. 8.
WITNESSES:
Elbert B Brunner
A. H. Kephart
INVENTOR.
H. KAPLAN.
BY
Carlos P. Griffin
ATTORNEY.

UNITED STATES PATENT OFFICE.

HENRY KAPLAN, OF SAN FRANCISCO, CALIFORNIA, ASSIGNOR TO LONG MANUFACTURING COMPANY, OF SAN FRANCISCO, CALIFORNIA, A CORPORATION OF CALIFORNIA.

LOCKING-RING FOR TIRES.

1,180,502.    Specification of Letters Patent.    Patented Apr. 25, 1916.

Application filed March 8, 1915. Serial No. 13,087.

*To all whom it may concern:*

Be it known that I, HENRY KAPLAN, a citizen of the United States, residing at San Francisco, in the county of San Francisco, State of California, have invented a new and useful Locking-Ring for Tires, of which the following is a specification in such full and clear terms as will enable those skilled in the art to construct and use the same.

This invention relates to a locking ring for tires and its object is to produce a ring which is applicable either to the locking of the ordinary clencher tire on the rims or to the locking of the ordinary tire rim on the felly band of a wheel.

An object of the invention is to simplify the construction of the locking device as far as it is possible in order to reduce the cost of construction of such wheel rims as well as to produce a locking ring which will have no mechanism thereon liable to injury from mud.

An embodiment of the invention is shown in the drawing in which the same reference numeral is applied to the same portion throughout, but I am aware that there are many modifications thereof.

Figure 2:
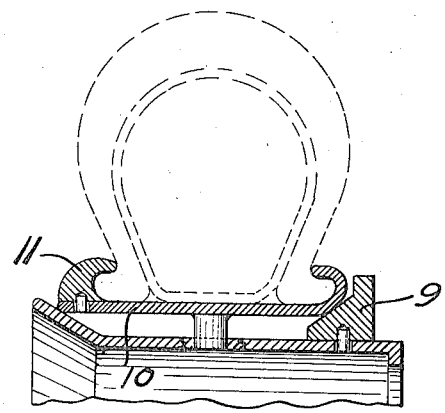

Figure 1 is a side elevation of a complete wheel with this locking ring applied to the support of the tire rim thereon shown, Fig. 2 is a cross sectional view of the felly band and tire rim illustrating their manner of construction, Fig. 3 is a perspective view of the felly band showing the slots therein for drawing the ring up against the wheel rim, Fig. 4 is a side elevation of the complete wheel ring showing the lock cover open, Fig. 5 is a plan view of a portion of the locking ring at its ends, Fig. 6 is a view with a portion of the locking ring adjacent the ends thereof looking outwardly along the radius thereof, Fig. 7 is a sectional view of the wheel ring at its ends illustrating the lock and guide carried thereby, and Fig. 8 is a perspective view of a portion of the locking ring showing the tool used for removing the same from the wheel.

The numeral 1 represents the hub, 2 the spokes and 3 the felly band of a wheel, said felly band having an anchor hole 3' therein and five inclined slots 4, 5, 6, 7 and 8.

The ring is indicated at 9 and it may be of the type shown at 9 in Fig. 2 or for holding the tire rim 10 in place, or it may be of the type shown at 11 in Fig. 2 for holding the tire on the rim, in either event it is locked by means of the hook 12 pivoted on the end of the ring 9 at 13 and caused to engage a projection 14 on the opposite end of the ring by means of the spring 15, said spring being secured to the underside of the ring by means of screws 16 and 17 as shown in Fig. 6. Also as shown in Fig. 6 one end of the ring is provided with a bar 18 which extends into a slot in the other end of the ring, the object being to afford a guide for the ring ends to cause them to be properly alined when being inserted on the wheel.

When the lock is in place and the rim secured to the felly band the cover plate 20 is rotated around from the position shown in Figs. 3 and 5 until it covers over the lock and the joint between the ends of the ring as illustrated in Fig. 1. The cover plate 20 is so formed as to cover both the lock hook 12 and the two openings 21 and 22, which openings are used for the purpose of spreading the ends of the ring apart. It is to be observed that the slot 8 is quite short while the slot 4 represents substantially the full length through which that end of the ring moves.

The anchor lug 23 is placed in the hole 3' while the lugs 24 to 28 inclusive are placed in the holes 4 to 8 inclusive. The holes 21 and 22 are provided with notches 29 and 30 to take a lug on the point of the tool which is inserted in said holes to spread the ring, the object being to prevent said tool from slipping out after being once inserted. When the ring is placed either with the lug 23 in the anchor hole 3' of the felly band or in a similarly placed anchor hole of the tire rim 10 the other lugs occupy different positions in the several slots and as the ends of the ring are brought together said lugs move the ring transversely against the tire or the tire rim as the case may be until the hook 12 snaps into its seat on the lug 14, whereupon the tool used to expand or close the ring may be removed and used on another wheel or returned to the tool box.

Any suitable instrument may be used for expanding and contracting said ring, but in Fig. 8 there is illustrated the preferred form of instrument in which figure arms 32 and 33 are pivotally connected by means of two short links 34 while near the middle of said arms they are provided with blocks 35 and 36 to the latter of which a head 37 is pivoted. The head 37 carries a screw 38 which passes through a bevel gear nut 39, said nut being in mesh with a small bevel gear 40 on a shaft 41.

The shaft 41 is carried by an L shaped block 43 pivoted on the block 35. Depending from the arm 33 is a sleeve 44 carrying a chisel shaped pin 45 for opening the hook 12. The pin 45 has an arm 46 to turn it and it carries a pair of prongs 47 to act as a gage for spacing the two arms 32 and 33 apart when their down turned ends are to be inserted in the holes in the ends of the ring. Any suitable instrument such as a brace 48 may be used for turning the shaft 41.

Having thus described my invention what I claim as new and desire to secure by Letters Patent of the United States, is as follows, modifications within the scope of the claim being expressly reserved:

A tire retaining device comprising a flat annulus having an outturned flange at one edge and having a plurality of slots at the other edge, said slots being of different lengths and inclined to the plane of the annulus, a ring having lugs to engage the slots in the annulus, said ring having holes at the ends thereof for the application of a tool to expand the ring, and a spring lock carried by one end of the ring and adapted to engage an abutment on the other end of the ring.

In testimony whereof I have hereunto set my hand this 25th day of February, A. D. 1915, in the presence of the subscribed witness.

HENRY KAPLAN.

Witness:
  HENRY B. LISTER.